(12) United States Patent
Hurtubise et al.

(10) Patent No.: US 11,642,731 B2
(45) Date of Patent: May 9, 2023

(54) TOOLING FOR MACHINING SYSTEMS UTILIZING SUPERCRITICAL FLUIDS

(71) Applicant: Fusion Coolant Systems, Inc., Canton, MI (US)

(72) Inventors: Andrew J. Hurtubise, Westland, MI (US); Scott Jones, Royal Oak, MI (US); Steven J. Skerlos, Ann Arbor, MI (US)

(73) Assignee: Fusion Coolant Systems, Inc., Canton, MI (US)

( * ) Notice: Subject to any disclaimer, the term of this patent is extended or adjusted under 35 U.S.C. 154(b) by 26 days.

(21) Appl. No.: 16/870,837

(22) Filed: May 8, 2020

(65) Prior Publication Data
US 2020/0353545 A1    Nov. 12, 2020

Related U.S. Application Data

(60) Provisional application No. 62/846,022, filed on May 10, 2019.

(51) Int. Cl.
*B23C 5/28* (2006.01)
*B23C 5/10* (2006.01)

(52) U.S. Cl.
CPC ............. *B23C 5/28* (2013.01); *B23C 5/1063* (2013.01)

(58) Field of Classification Search
CPC ....... B23C 5/28; B23C 5/285; B23C 2250/12; B23B 51/06
See application file for complete search history.

(56) References Cited

U.S. PATENT DOCUMENTS 3,077,802 A    2/1963   Philip
3,303,731 A    2/1967   Zawistowski
(Continued)

FOREIGN PATENT DOCUMENTS

CN    201231333 Y    5/2009
CN    107378635 A    11/2017
(Continued)

OTHER PUBLICATIONS

International Search Report and Written Opinion for International Application No. PCT/US2020/015355, dated May 21, 2020.
(Continued)

*Primary Examiner* — Alan Snyder
(74) *Attorney, Agent, or Firm* — Wolf, Greenfield & Sacks, P.C.

(57) ABSTRACT

Improvements in tooling for machining systems that utilize machining fluids comprising a supercritical fluid are disclosed. In some embodiments a tool may include a plurality of orifices configured to direct a supercritical machining fluid towards a cutting interface of the tool. In other embodiments, a tool holder may include one or more outlets configured to direct a supercritical machining fluid towards a cutting interface. Moreover, some embodiments, may relate to machining systems including one or more venting channels configured to provide pressure relief for a cavity located behind a tool holder. Embodiments related to machine tools including upstream fluid restrictions for controlling a flow of supercritical machining fluid through a tool are also disclosed.

29 Claims, 9 Drawing Sheets

(56) References Cited

U.S. PATENT DOCUMENTS

| | | | |
|---|---|---|---|
| 3,897,335 | A | 7/1975 | Brandt |
| 4,961,325 | A | 10/1990 | Halvorson et al. |
| 5,733,174 | A | 3/1998 | Bingham et al. |
| 6,045,301 | A | 4/2000 | Kammermeier et al. |
| 7,316,363 | B2 | 1/2008 | Hume et al. |
| 7,414,015 | B2 | 8/2008 | Skerlos et al. |
| 10,007,246 | B2 | 6/2018 | Grant |
| 10,040,129 | B2 | 8/2018 | Voss |
| 10,052,694 | B2 | 8/2018 | Musil et al. |
| 2005/0268938 | A1 | 12/2005 | Johnson et al. |
| 2006/0222470 | A1 | 10/2006 | Tchorny et al. |
| 2007/0125883 | A1 | 6/2007 | Colter |
| 2008/0293599 | A1 | 11/2008 | Skerlos et al. |
| 2009/0214305 | A1* | 8/2009 | Waggle .................. B23C 5/28 407/48 |
| 2009/0320655 | A1 | 12/2009 | Grant |
| 2011/0113866 | A1 | 5/2011 | Finlay |
| 2012/0082518 | A1 | 4/2012 | Woodruff et al. |
| 2012/0237311 | A1 | 9/2012 | Dionne et al. |
| 2013/0213521 | A1 | 8/2013 | Isom et al. |
| 2017/0320141 | A1 | 11/2017 | Musil et al. |
| 2019/0134723 | A1 | 5/2019 | Mueller et al. |
| 2020/0246928 | A1 | 8/2020 | Skerlos et al. |

FOREIGN PATENT DOCUMENTS

| | | |
|---|---|---|
| CN | 107716953 A | 2/2018 |
| CN | 109465483 A | 3/2019 |
| DE | 10 2017 109110 A1 | 11/2019 |
| EP | 3 219 421 A1 | 9/2017 |
| JP | 2013-027962 A | 2/2013 |

OTHER PUBLICATIONS

Clarens, Carbon dioxide based metal working fluids. Dissertation submitted in partial fulfillment of the requirements for the degree of Doctor of Philosophy (Environmental Engineering and Natural Resources and Environment) in the University of Michigan. 2008, 171 pages.

Mulyana et al., The influence of cryogenic supercritical carbon dioxide cooling on tool wear during machining high thermal conductivity steel. Journal of Cleaner Production. 2017;164:950-62.

Rahim et al., Experimental investigation of supercritical carbon dioxide ($SCCO_2$) performance as a sustainable cooling technique. Procedia CIRP. 2016;40:637-41.

Rahim et al., Study on pulse duration of supercritical carbon dioxide coolant delivery on machining performance of AISI 1045. International Journal of Engineering and Technology. Dec. 2016;8(6):2646-53.

Stephenson et al., Rough turning Inconel 750 with supercritical CO2-based minimum quantity lubrication. Journal of Materials Processing Technology. 2014;214:673-80.

Tapoglou et al., Investigation of the influence of $CO_2$ cryogenic coolant application on tool wear. Procedia CIRP. 2017;63:745-9.

International Search Report and Written Opinion for International Application No. PCT/US2020/032059, dated Sep. 16, 2020.

PCT/US2020/015355, May 21, 2020, International Search Report and Written Opinion.

* cited by examiner

TOOLING FOR MACHINING SYSTEMS UTILIZING SUPERCRITICAL FLUIDS

CROSS-REFERENCE TO RELATED APPLICATIONS

This application claims the benefit under 35 U.S.C. § 119(e) of U.S. provisional application Ser. No. 62/846,022, filed May 10, 2019, the disclosure of which is incorporated by reference herein in its entirety.

FIELD

Disclosed embodiments are related to machining systems utilizing supercritical machining fluids. Some embodiments relate to tooling for such machining systems.

BACKGROUND

Machining tools, such as milling systems, lathes, computer numerical control (CNC) systems, robotic drills, and/or machining centers may employ machining fluids such as metalworking fluids to provide cooling and/or lubrication during a cutting or forming process. The machining fluid may be delivered to an interface between a cutting tool and a workpiece during a cutting or forming process. In some applications, the machining fluid may be delivered externally, such as by routing the machining fluid through a series of pipes and to one or more nozzles that direct the machining fluid toward the cutting interface. In other applications, the machining fluid may be routed internally to the interface, such as through a tool holder and/or through a cutting tool (e.g., through one or more channels formed in a cutting tool).

Conventional machining fluids may comprise mixtures including a cooling fluid (such as air, water, liquid carbon dioxide, or liquid nitrogen) to cool a cutting zone and a lubricant (such as oil, a minimum quantity lubrication (MQL) fluid, or synthetic fluids) to lubricate the cutting zone during a cutting process. In some instances, a machining fluid only including an oil, emulsion, or a synthetic fluid may be suitable. In some applications supercritical fluids, such as supercritical carbon dioxide ($scCO_2$) have been utilized as a portion of a machining fluid.

SUMMARY

In one embodiment, a tool for a machining system utilizing a supercritical machining fluid includes a tool body extending from a proximal end of the tool configured to be received in a tool holder to a distal end of the tool. The tool also includes a fluid channel formed in the tool body having an inlet located in a proximal portion of the tool body. The inlet is configured to receive the supercritical machining fluid. The tool further comprises a plurality of orifices formed on an outer surface of the tool body. Each orifice of the plurality of orifices is in fluid communication with the fluid channel, and at least one orifice of the plurality of orifices is located on a side surface of the tool body. Each orifice has a diameter between about 50 microns and about 500 microns.

In another embodiment, a tool for a machining system utilizing a supercritical machining fluid comprises a tool body extending from a proximal portion configured to be received in a tool holder to a distal end. The tool also comprises a fluid channel formed in the tool body having an inlet at the proximal end of the tool body and at least one recess formed on an outer surface of the tool body. The at least one recess defines at least one surface oriented along a first direction and the at least one recess is spaced from the distal end of the tool body. The tool also comprises an orifice formed in the at least one surface in fluid communication with the fluid channel. In such an embodiment, the at least one orifice may be configured to direct supercritical machining fluid out of the orifice along the first direction.

In yet another embodiment, a tool holder for a machining system includes a tool holder body including a tool receiving region at a first end portion and an attachment interface at a second end portion opposite the first end portion. The tool receiving region is constructed and arranged to receive a tool and secure the tool to the tool holder body. The attachment interface is constructed and arranged to secure the tool holder to a machining system. The tool holder is configured to be rotated during a machining process. The tool holder includes one or more outlets positioned proximate to the first end portion of the tool holder body, and each outlet is configured to direct supercritical machining fluid towards a cutting interface of the tool.

In one embodiment, a machining system comprises a tool holder constructed and arranged to receive a tool and secure the tool within the tool holder. The tool is configured to deliver a supercritical machining fluid to a cutting interface through the tool. A spindle is constructed and arranged to receive the tool holder, and a cavity formed between the tool holder and the spindle is in fluid communication with an exterior of the machining system.

In another embodiment, a tool for a machining system utilizing a supercritical machining fluid includes a tool body extending from a proximal end configured to be received in a tool holder to a distal end. The tool includes an inlet formed in a proximal portion of the tool body, and the inlet is configured to receive a supercritical machining fluid. The tool also includes a flow restriction disposed in the tool body and in fluid communication with the inlet and a fluid channel formed in the tool body. The fluid channel is downstream from and in fluid communication with the flow restriction. The tool also includes one or more orifices formed on an outer surface of the tool body, and each orifice of the one or more orifices is in fluid communication with the fluid channel. In such an embodiment, a flow resistance of the one or more orifices and the fluid channel is less than a flow resistance of the flow restriction.

In another embodiment, a tool for a machining system utilizing a supercritical machining fluid comprises a tool body comprising a fluid channel. The tool body extends from a proximal end configured to be received in a tool holder to a distal end and further comprises one or more orifices located on an outer surface of the tool body. Each of the one or more orifices is in fluid communication with the fluid channel of the tool body and an insert including a flow restriction is disposed in a cavity formed in a proximal portion of the tool body. The flow restriction is upstream from and in fluid communication with the fluid channel of the tool body, and a flow resistance of the flow restriction is greater than a flow resistance of the plurality of orifices and the fluid channel.

In one embodiment, a machining method includes flowing a super critical machining fluid through a flow restriction of a tool body into a fluid channel of the tool body and then expanding the supercritical machining fluid in the fluid channel. Next, the method includes flowing the expanded supercritical machining fluid though one or more orifices formed on an outer surface of the tool body. In such an embodiment, a flow resistance of the one or more orifices and the fluid channel is less than a flow resistance of the flow restriction.

An alternate machining method comprises flowing supercritical machining fluid into an inlet of a tool body, flowing the supercritical machining fluid through a fluid channel formed in the body, and then flowing the supercritical machining fluid out of the fluid channel through a plurality of orifices formed on an outer surface of the tool body. Each orifice has a diameter between about 50 microns and about 500 microns, and at least one orifice of the plurality of orifices is located on a side surface of the tool body.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
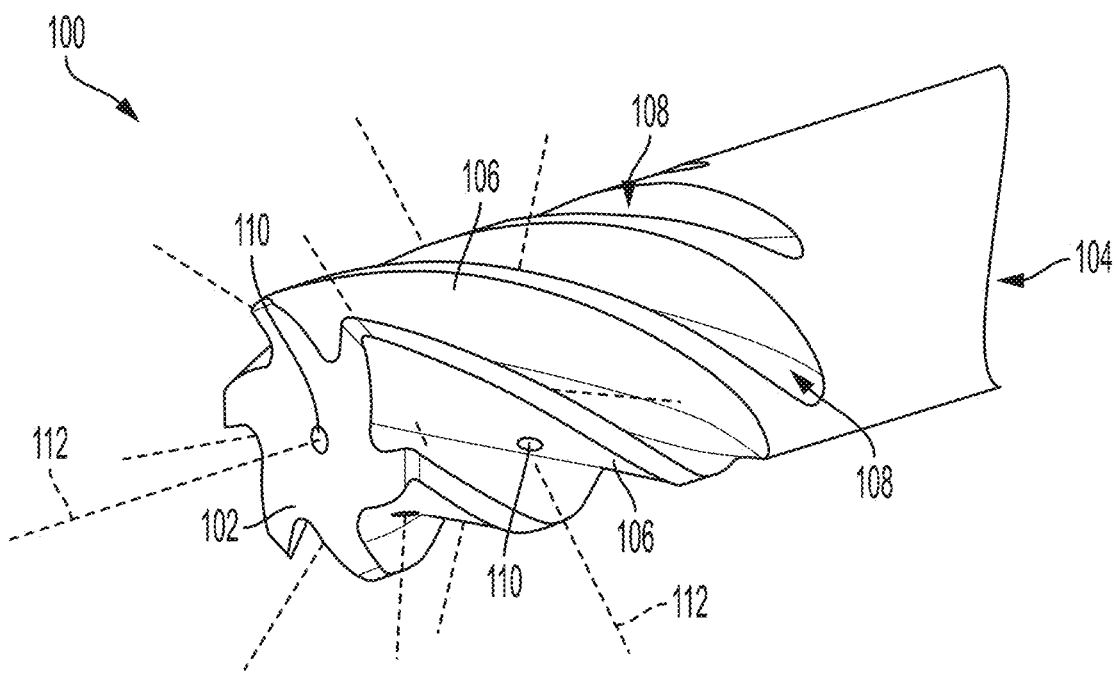
FIG. 1 is a perspective view of a tool, according to some embodiments.

Aspects described herein relate to improvements in tooling approaches for machining systems utilizing machining fluids comprising a supercritical machining fluid, such as supercritical carbon dioxide ($scCO_2$) or supercritical nitrogen. The inventors have appreciated that supercritical machining fluids may provide numerous benefits compared to conventional machining fluids, such as water-based machining fluids, oil-based machining fluids (e.g., neat oils), minimum quantity lubrication (MQL) fluids, or synthetic machining fluids). As used herein, a supercritical fluid refers to a fluid that is maintained above its critical point (i.e., at a temperature above the critical temperature and at a pressure above the critical pressure). For example, the critical temperature and pressure for carbon dioxide are 31.1° C. and 72.8 atm, respectively, which are readily achievable in industrial applications. Above the critical point, distinct liquid and gas phases do not exist; instead, supercritical fluids exhibit characteristics of both liquids and gases. For example, supercritical fluids may exhibit the flow and expansion behaviors of gasses while also being able to dissolve materials like a liquid. In machining applications, rapidly expanding supercritical machining fluids may provide better cooling and/or more efficient heat transfer, may provide for better mixing with lubricants or dissolution of lubricants, and/or allow for the use of smaller amounts of lubricants compared to conventional water-based machining fluids The inventors have recognized and appreciated that conventional approaches for tooling design may not be suitable for use with supercritical machining fluids. In some instances, conventional tooling designs may achieve sufficient coverage of machining fluid over a cutting interface without requiring any particular considerations for how the machining fluid is directed towards the cutting interface. For example, the intrinsic mass of conventional water and/or oil-based machining fluids may allow the momentum of a rotating tool or workpiece to adequately spread the machining fluid across the entire cutting interfaces to achieve sufficient coverage. Accordingly, relatively simple arrangements of machining fluid nozzles and/or exit orifices on a tool (e.g., to simply flood the cutting interface with machining fluid) may be sufficient to achieve sufficient machining fluid coverage. In contrast, the inventors have recognized that supercritical fluids (including supercritical machining fluids) expand rapidly upon exiting an orifice (e.g., of a nozzle and/or on a tool), and may exhibit substantially zero mass behavior such that little or no momentum is imparted to a rapidly expanding supercritical fluid by a rotating tool or workpiece. Consequently, the supercritical machining fluid may remain in a location corresponding to where the supercritical fluid was directed by a corresponding nozzle and/or orifice, and thus, sufficient coverage of a cutting interface may not be achieved to adequately cool and/or lubricate the cutting interface.

In view of the above, the inventors have recognized and appreciated numerous advantages with tooling that is specifically constructed and arranged to address one or more of the above-noted challenges associated with supercritical machining fluids. According to some aspects, tooling for use with machining systems may be constructed and arranged to direct a supercritical machining fluid towards a cutting interface to achieve a desired coverage of the supercritical machining fluid over the cutting interface. In particular, some aspects described herein relate to tooling in which supercritical machining fluid is delivered through a tool holder and/or through a tool. For example, in some embodiments, a tool holder may include one or more nozzles and/or planar surfaces through which a flow of supercritical machining fluid exits the tool holder that are configured to direct the supercritical fluid towards the cutting interface. Alternatively or additionally, in some embodiments, a tool (such as a rotatable bit) may include a plurality of outlet orifices positioned along a length of the tool. For example, some orifices may be located proximally from an end of the tool, such as adjacent proximal end(s) of one or more flutes formed in the tool. As described in more detail below, such orifices may be configured to direct supercritical machining fluid along a length of the one or more flutes. Moreover, other orifices may be positioned more distally, such as within the one or more flutes. Depending on the particular embodiment, these various orifices may be positioned along the tool to provide a desired coverage of the cutting interface with supercritical machining fluid.

In some embodiments including a tool holder with nozzles configured to direct supercritical machining fluid towards a cutting interface, the nozzles may be constructed and arranged to direct the supercritical machining fluid at a desired angle relative to a longitudinal axis of a tool held in the tool holder. In certain embodiments, the angle for a particular nozzle may be selected based on a target interface (e.g., a cutting interface) or target area located distally from and radially inward from the nozzle (i.e., down the length of the tool). In some instances, the target area may be determined based on a diameter of tool. For example, the angle of a nozzle may be selected such that the target area for the nozzle is positioned down the tool a distance corresponding to between two and five times the diameter of the tool. For example the target area of the nozzle may be positioned a distance of about three times the tool diameter down the length of the tool from the nozzle. Without wishing to be bound by any particular theory, the inventors have found that such arrangements may allow supercritical machining fluids (e.g., machining fluids comprising $scCO_2$) to provide sufficient coverage of a cutting interface in some applications.

In some embodiments, a tool holder may have a plurality of nozzles (e.g., more than two nozzles) distributed around a circumference of the tool holder. For example, each of the nozzles may be oriented at an angle with respect to the longitudinal axis of the tool (as discussed above) to provide a desired coverage of machining fluid around the circumference of the tool at the cutting interface. Moreover, in some embodiments, a tool holder may include nozzles oriented at different angles relative to the longitudinal axis of the tool. For example, some nozzles may be configured to direct supercritical machining fluid to a distal portion of the cutting interface, while other nozzles may be configured to direct the supercritical machining fluid to a central and/or proximal end of the cutting interface. In one exemplary embodiment, a first nozzle or set of nozzles may be arranged to direct supercritical machining fluid down a tool a distance corresponding to three times a diameter of the tool, and a second nozzle or set of nozzles may be arranged to direct the supercritical machining fluid down the tool a distance corresponding to five times the diameter of the tool. Of course, it should be appreciated that other arrangements including various combinations of distances may be suitable, as the current disclosure is not limited in this regard. Moreover, in some embodiments, a configuration of nozzles (e.g., two, three, or any other appropriate number of nozzles) may be tailored to provide a desired amount, flow rate, and/or coverage of supercritical machining fluid for a particular cutting process.

According to some aspects, a tool for a milling or drilling operation may include a plurality of orifices configured to deliver supercritical machining fluid traveling through the tool (e.g., through a cavity formed in an interior of the tool) to a cutting interface. The inventors have recognized and appreciated that unlike with conventional machining fluids, the configuration of such orifices can have a substantial impact on the direction in which a supercritical machining fluid is directed out of the orifices. In particular, the inventors have appreciated that supercritical fluids tend to be directed along a direction normal to a surface in which an orifice is formed. Accordingly, in some embodiments, a tool may include one or more recesses defining a planar surface in which an orifice is formed, and the orientation of the planar surface may be selected to provide a desired direction of travel for the supercritical machining fluid when it exits the orifice. For example, in some embodiments, recesses may be formed having a planar surface that is substantially normal to a direction oriented towards a cutting interface and/or a longitudinal axis of the tool (i.e., a direction normal to the surface is substantially parallel to the longitudinal axis of the tool), such that supercritical fluid exiting an orifice formed in the surface is directed substantially parallel to the longitudinal axis of the tool. In this manner, supercritical machining fluid may be directed through the tool, out of the orifice, down the length of the tool, and focused towards a target area along the tool (e.g., a cutting interface). For instance, such orifices may be desirable in applications in which delivery of machining fluid down one or more flutes or other cutting features formed in a tool is desirable to cool and/or lubricate a cutting interface associated with the flutes or cutting features.

According to some aspects, a recess formed in an outer surface of a tool also may aid in directing supercritical machining fluid along a desired direction, such as along the length of a tool and/or towards a cutting interface. For example, a recess may include walls defining a channel oriented along the desired direction. In this manner, if supercritical machining fluid exits an orifice formed on a surface defined by the recess along a direction other than normal to the surface (which may be oriented along the desired direction), the channel may aid in redirecting the supercritical machining fluid towards the desired direction to aid in focusing the supercritical machining fluid towards a target area such as a cutting interface.

Alternatively or additionally, in some embodiments, a tool may include one or more orifices configured to direct supercritical machining fluid along directions other than down a length of a tool. For example, in certain embodiments, one or more orifices may be configured to direct supercritical machining fluid radially outwardly, towards one or more flutes or cutting features formed on a tool, and/or along any other suitable direction. Depending on the particular embodiment, such orifices may be positioned on an outer surface of a tool shank, within one or more flutes or other cutting features formed on a tool shank (e.g., such that the orifices may deliver supercritical machining fluid directly to the flutes), and/or at any other suitable location on a tool. In other embodiments (e.g., in fixed cutting tool applications), a tool may include multiple orifices configured to direct supercritical machining fluid towards different portions of a cutting interface of a tool.

According to some aspects, the inventors have recognized and appreciated that the size of the various orifices formed in a tool and/or tool holder may be selected to provide a desired combination of pressure and flow characteristics for a supercritical machining fluid. In particular, the inventors have discovered that particular ranges of orifice diameters may provide desirable pressure and flow characteristics for different applications to match the characteristics of other components of a machining system, including the pumping architecture associated with the supercritical machining fluid. For example, a diameter or other maximum transverse dimension of the orifices may be greater than or equal to about 50 µm, 100 µm, 150 µm, 200 µm, and/or any other appropriate dimension. Correspondingly, the diameter or other maximum transverse dimension of the orifices may be less than or equal to 500 µm, 400 µm, 300 µm, 200 µm, and/or any other appropriate dimension. Combinations of the foregoing are contemplated including a diameter of the orifices that is between about 50 microns and about 500 microns (e.g., about 150 microns). The inventors have further appreciated that such orifice diameters, while providing numerous benefits when used in connection with supercritical machining fluids as described herein, may not be suitable for use with conventional machining fluids such as water-based emulsions. For example, many conventional water-based machining fluids would likely not flow through such small orifices due to surface tension effects, and the lubricants suspended in some conventional machining fluids (e.g., liquid $CO_2$) would likely clog the orifices. In contrast, supercritical machining fluids may easily flow out of such small orifices. Moreover, oils or other suitable lubricants may be soluble in supercritical machining fluids such as $scCO_2$ such that the oils do not clog the orifices.

In some embodiments, the diameter of the orifices may be selected based on the number of orifices that may be required for a tool used in a particular application. For example, in applications in which a large number of orifices is desirable to provide delivery of machining fluid to multiple locations along a tool and/or cutting interface, smaller diameter holes may be beneficial. In other applications, such as gun drilling applications, fewer orifices may be used (e.g., as few as one), and correspondingly, the orifice(s) may be larger (e.g., about 500 microns). Depending on the particular embodiment, such orifices (and corresponding channels through the tool) may be formed via any suitable method. For example, in some instances, the orifices may be formed by laser drilling and/or electrical discharge machining (EDM).

In addition to the above, the inventors have recognized and appreciated that in some applications, conventional spindle and tool holder designs (e.g., as used in milling systems) may not be suitable for use with supercritical machining fluids. For example, many conventional spindle and tool holder designs for use with through-tool cooling arrangements include a cavity located behind the tool holder that fills with machining fluid as fluid is delivered into the tool holder, and ultimately into the tool. In some applications, a coolant tube may be provided that spans the cavity between the spindle and the tool holder to deliver machining fluid directly to the tool holder. When used with conventional machining fluids, such arrangements are generally suitable. However, the inventors have recognized that these arrangements may not be suitable for use with supercritical machining fluids due to the pressurized nature of supercritical fluids. In particular, the inventors have recognized that accumulation of supercritical machining fluid in a cavity behind a tool holder may lead to pressurization of the cavity, which may lead to the tool holder becoming dislodged from the spindle. Even in arrangements including a coolant tube, leaking of supercritical fluid into a cavity can lead to similar undesirable pressurization of the cavity behind the tool holder.

In view of the above, the inventors have recognized numerous advantages associated with spindle and/or tool holder configurations that can avoid such undesirable pressurization of a cavity behind a tool holder at a tool holder-spindle attachment interface. In some embodiments, a spindle may include one or more venting channels in communication with the cavity between the spindle and a tool holder. These one or more venting channels may be configured to relieve any pressure that may build up in the cavity. In this manner, if a coolant tube leaks supercritical fluid into the cavity, the supercritical fluid may be vented out of the venting channels to avoid buildup of pressure behind the tool holder. In some instances, such embodiments of vented spindles may allow for compatibility with existing tool holders (e.g., tool holders designed for use with conventional machining fluids), which may allow such tool holders (and any associated tools) to be used in cutting operations utilizing supercritical machining fluids.

Alternatively or additionally to the above, one or more venting channels may be formed in a tool holder. Similar to the embodiments discussed above, such cooling channels may be in communication with a cavity between the tool holder and a spindle and configured to relieve any pressure that may build up in the cavity, e.g., as a result of pressurized supercritical machining fluid leaking into the cavity. In some instances, such vented tool holder arrangements may allow for the use of supercritical machining systems with machining systems and spindles designed for use with conventional machining systems.

According to some aspects, a tool for a machining system (e.g., a milling or drilling bit) may be configured such that a supercritical machining fluid flows through the tool from a corresponding source of supercritical machining fluid for cooling and/or lubrication purposes. Such a tool may extend from a proximal end, configured to be received in a tool holder, to an opposing distal end, configured to interface with a workpiece during a machining process. A fluid channel may extend through at least a portion of the interior of the tool from the proximal portion of the tool towards the distal end of the tool. One or more orifices may be formed in and extend through an outer surface of the tool such that the outer surface of the tool is in fluid communication with the fluid channel. Depending on the embodiment, these orifices may be located on the sides, on a distal portion, and/or at a distal end of the tool. During operation, supercritical machining fluid may flow into the fluid channel through an inlet located on a proximal portion, such as a proximal end, of the tool and into the fluid channel. The supercritical cooling fluid may then flow out from the fluid channel through each of the orifices in fluid communication.

When using a tool that includes channels and orifices through which a supercritical machining fluid flows, the supercritical machining fluid will go through an expansion, and corresponding reduction in temperature when it is exposed to a pressure differential that causes the supercritical machining fluid to drop below a critical pressure of the supercritical machining fluid. This rapid expansion and cooling of the machining fluid may cause icing in some situations which may inhibit the flow of supercritical machining fluid resulting in damage to the machine system, tool, and/or workpiece being machined. Thus, the expansion point for a supercritical machining fluid is typically located at the one or more orifices formed in a tool that are located adjacent to a cutting interface between the tool and workpiece. This arrangement allows the expansion points of the supercritical machining fluid to be located adjacent to the location of heat generation (i.e. the cutting surface) and the supercritical machining fluid may be kept in the supercritical state within the interior of the tool, both of which have typically been used to avoid icing of a tool. However, the Inventors have recognized that tools constructed to provide this functionality often use manufacturing processes and/or tool designs that are not compatible with manufacturing processes and machines that use conventionally cooled tools.

In view of the above, the Inventors have recognized a need for tools including in tool delivery of a supercritical machining fluid that have been designed for easy manufacturing and integration with existing manufacturing processes and/or machining systems. However, tools made for use with conventional machining fluids use channels and orifices that are too large for supercritical machining fluids which would result in excessively large flow rates of the supercritical machining fluid during a machining process. Accordingly, the Inventors have recognized the benefits associated with a tool including an upstream flow restriction with a flow resistance greater than that of the one or more fluid channel and orifices located downstream from the flow restriction. This may cause the supercritical fluid to expand within the tool body prior to exiting through the one or more orifices of the tool onto a cutting interface between a tool and a work piece. Such an arrangement is counter to the to the typical design consideration of locating the expansion point of a supercritical machining fluid at the orifices located proximate to a cutting interface to avoid icing. However, the Inventors have determined that the heat generated as a byproduct of the machining process is sufficient to prevent the tool and/or machining system from icing even when the expansion point of the supercritical machining fluid is located within an interior of the tool and that the time to icing is sufficiently long such that a machining process may be initiated prior to icing occurring.

In view of the above, a machining tool configured to utilize a supercritical machining fluid may include a flow restriction within a proximal portion (e.g. near a shank from which the tool is attached to a tool holder). The flow restriction may be upstream from and in fluid communication with a fluid channel and one or more orifices of the tool. Supercritical machining fluid provided by a supercritical machining fluid source may flow into an inlet of the tool and through the upstream flow restriction. Upon exiting the flow restriction, the supercritical machining fluid may expand in the one more fluid channels, or other appropriate downstream portion, of the tool before flowing out of the tool through one or more orifices and onto a desired cutting interface. In some embodiments, a flow resistance through the one or more orifices and fluid channel may be less than the flow resistance of the flow restriction.

As noted above, typical tools used for in tool delivery of a machining fluid have dimensions that are inappropriate for use with supercritical machining fluids. However, in some embodiments, adding an upstream flow restriction to a tool may restrict the flow of machining fluid into a channel of a tool and permit expansion to occur within the tool. This may enable the use of tools with relatively larger diameter orifices that are typically used with conventional machining fluids (e.g., oil, minimum quantity lubrication (MQL) fluid, or synthetic fluids) to be used with supercritical fluids. Thus, in some embodiments, existing tool designs may either be modified, or retrofitted with an insert or other attached component, to include an upstream flow restriction to enable their use with supercritical machining fluids.

Types of flow restrictions that may be used with the embodiments described herein may include appropriately dimensioned through holes formed in a component, nozzles, and/or any other appropriate type of flow restriction that may exhibit a flow resistance greater than the one or more downstream channels and orifices in fluid communication with the flow restriction. The flow restrictions may also be incorporated into a tool in any appropriate manner including: integral formation; an insert that is inserted into a cavity formed in a portion of the tool; a component attached to a proximal portion of the tool; and/or any other appropriate construction. In instances where a separate insert or component is attached to the tool, it may be attached using a threaded connection, a press fit, welding, brazing, and/or any other appropriate type of connection as the disclosure is not limited in this fashion.

A flow restriction may exhibit any appropriate range of flow resistances relative to a combined flow resistance of a fluid channel and one or more orifices disposed downstream from the flow restriction. For example, in some embodiments, a ratio of a flow resistance of a flow restriction and a combined flow resistance of the downstream fluid channel and one or more orifices may be greater than or equal to 4, 5, 10, 20, 40, or any other appropriate ratio of the flow resistances. Correspondingly, the ratio of the flow resistances of the flow restriction and the combined flow resistance of the downstream fluid channel and one or more orifices may be less than or equal to 50, 40, 30, or any other appropriate ratio. Combinations of the foregoing ranges are contemplated including, for example, a ratio of a flow resistance of a flow restriction and a combined flow resistance of a downstream flow channel and one or more offices may be between or equal to 4 and 50 and/or any other appropriate combination of the foregoing. Of course, it should be understood that ratios both greater than and less than those noted above are contemplated. For example, the ratio of a flow resistance of a flow restriction and a combined flow resistance of a downstream fluid channel and one or more orifices may be bounded on the upper side by channels and orifices that are sufficiently large such that the restriction functions as if it were exhausting directly to the external atmosphere. It should be understood that a tool including an upstream flow restriction may be used with any of the other embodiments or tools and machining systems described herein.

In embodiments where it is desirable to expand a supercritical machining fluid within the interior of a tool, appropriate combinations of the sizes of a restriction orifice and corresponding fluid channels and orifices formed in the tool may be used. For example, in one embodiment, a restriction orifice formed in a flow restriction that provides a flow path through the flow restriction may have a maximum transverse dimension (e.g. a diameter) that is greater than or equal to 50 μm, 100 μm, 150 μm, 200 μm, and/or any other appropriate dimension. Correspondingly, the restriction orifice may have a maximum transverse dimension that is less than or equal to 300 μm, 200 μm, 150 μm, and/or any other appropriate dimension. Combinations of the foregoing are contemplated including a maximum transverse dimension of a restriction orifice that is between or equal to 50 μm and 300 μm. Corresponding maximum transverse dimensions of a fluid channel and one or more orifices formed on an exterior surface of the tool that are in fluid communication with and downstream from a flow restriction may be greater than or equal to 500 μm, 750 μm, 1000 μm, 1500 μm, and/or any other appropriate dimension. The maximum transverse dimension of the fluid channel and the one or more orifices formed on the exterior surface of the tool may also be less than or equal to 2000 μm, 1500 μm, 1000 μm, and/or any other appropriate dimension. Combinations of the foregoing are contemplated including, for example, a maximum transverse dimension of the fluid channel and the one or more orifices formed on the exterior surface of the tool that is between or equal to 500 μm and 2000 μm. Of course while particular ranges of the dimensions of a restriction orifice as well as a fluid channel and external orifices of a tool have been noted above, dimensions both greater than and less than those described above are also contemplated as the disclosure is not limited in this fashion.

Without wishing to be bound by theory, supercritical machining fluids are not compatible with every material and/or technique used in typical machining systems and tools due to effects such as carbonation of materials; embrittlement; explosive decompression; dissolving of the materials; and other effects. Accordingly, the various seals, O-rings, and joints and interfaces exposed to the supercritical machining fluid of a tool, toolholder, components attached to a toolholder (e.g. coolant pipe, collet, etc.), a spindle, and/or any other appropriate component of a machining system may include materials that are selected to be compatible with the supercritical machining fluid such that these components and systems may be configured for operation with the supercritical machining fluid as compared to typical systems which may not be compatible with the supercritical machining fluid. For example, materials may be selected based on the operating temperature and pressure ranges associated with the supercritical fluid as well as to provide compatibility with the supercritical fluid. For example, operating pressures may be between about 100 and 140 bar, and in some instances, up to about 200 bar, 300 bar, 400 bar or more, and operating temperatures may be between about 20° C. and about 100° C. In some embodiments, suitable materials for seals and O-rings that can operate in these pressure and temperature ranges and also provide compatibility with supercritical fluids such as $scCO_2$ include, but are not limited to, perfluoroelastomers (e.g. Kalrez 0090), hard durometer fluoroelastomers (e.g. hard durometer Viton and Viton encapsulated with fluorinated ethylene propylene), hydrogenated acrylonitrile butadiene rubber, and polytetrafluoroethylene (PTFE). In some applications, it may be beneficial to select the highest durometer available of a seal or O-ring formed from a suitable material. Moreover, joints that may be suitable for connecting various portions of the systems described herein include, but are not limited to, hydraulic joints such as National Pipe Thread (NPT), British Standard Pipe (BSP and/or BSPP), Joint Industrial Council (JIC), and/or other compression fittings rated to greater than or equal to 200 bar.

For the sake of clarity, a majority of the embodiments described herein are described relative to rotational machining systems that include a rotating toolholder and tool held in the toolholder with corresponding flows of supercritical machining fluid routed through one or both of these components. However, it should be understood that the various embodiments described herein may be used with any appropriate combination of rotational and/or rotationally stationary tools and/or toolholders as the disclosure is not limited in this fashion.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a perspective view of one embodiment of a tool 100 in accordance with some aspects described herein. In particular, tool 100, which may be configured as a milling tool and/or for use with a machining center, includes a distal end 102 and a proximal end 104 (e.g., a shank of the tool 100), which may be received in a tool holder of a machining system (not depicted). The tool 100 includes a plurality of flutes 106 separated by channels 108. The flutes may include cutting edges that define at least a portion of a cutting interface when the tool is in use in a machining system. In the depicted embodiment, the flutes 106 extend helically along the tool; however, it should be understood that other flute configurations may be suitable, as the current disclosure is not limited to any particular configuration of flutes 106 and channels 108. For example, in other embodiments, the flutes may be substantially linear.

Figure 2:
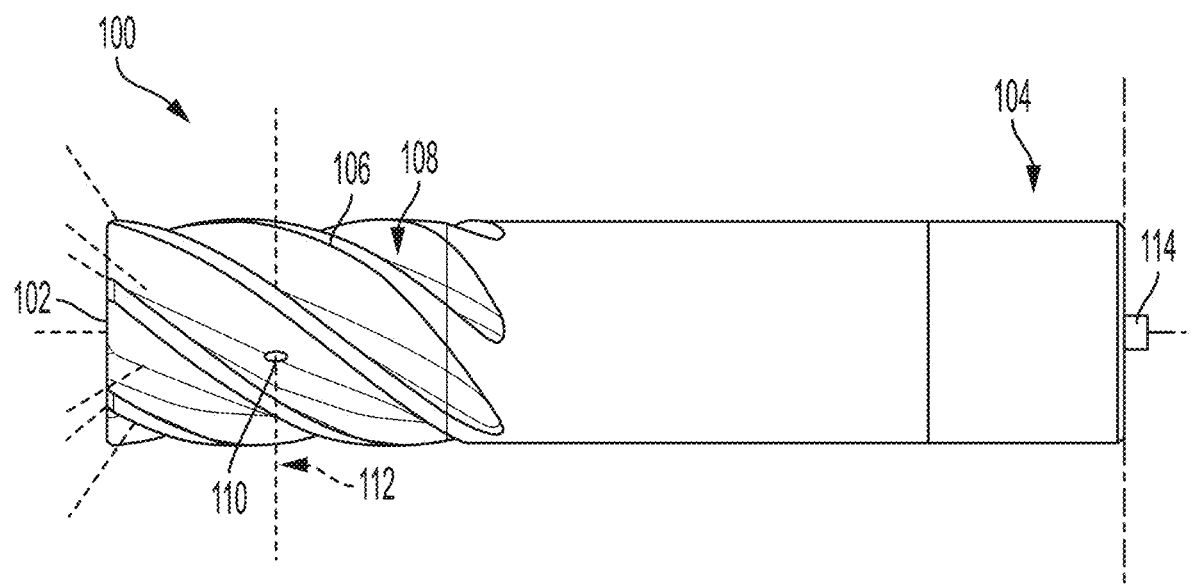
FIG. 2 is a side view of the tool of FIG. 1.

The tool includes a plurality of orifices 110 that are in fluid communication with a central fluid channel formed through at least a portion of the tool (e.g., see FIG. 2). In this manner, supercritical machining fluid delivered into the central fluid channel at the proximal end of the tool may be delivered to the cutting interface via orifices 110 where the supercritical machining fluid exits along lines 112. For clarity, not every line 112 is labeled in FIG. 1. As illustrated, a tool may include a plurality of orifices formed on surfaces of the tool having different orientations such that supercritical machining fluid exits the tool along a plurality of different directions (indicated by the lines 112) to provide a desired coverage of supercritical machining fluid for a particular machining application. Each line 112 is generally perpendicular to a surface on the tool where a corresponding orifice 110 is formed. For example, orifices 110 may be formed in channels 108 such that the supercritical machining fluid is directed towards the cutting edges of the flutes 106. Further, as elaborated on further below, in some embodiments, a surface of the tool body surrounding these orifices may be planar and/or recessed to facilitate controlling a direction of the flow of supercritical machining fluid. In some instances, one or more orifices may be formed on a distalmost surface, which may be normal to a longitudinal axis of the tool, such that supercritical machining fluid exits the distal tip parallel to the longitudinal axis of the tool.

In view of the above, the it should be understood that the plurality of orifices formed in a tool body may be positioned on any number of surfaces of a tool body and oriented in a number of desired directions. Including, for example, one or more orifices of the plurality of orifices may be located on: a side surface of the tool body extending between the proximal and distal ends of a tool body; a distal surface of the tool body; and/or any other appropriate portion of the tool body. Additionally, the orifices may be configured to direct the streams of supercritical machining fluid towards any appropriate cutting interface which may either be located at a distal end of the tool body and/or radially outwards from the total body as described above in regards to the embodiment including orifices configured to direct supercritical machining fluid in a direction that includes a component that is directed radially outwards towards an interface between the flutes and a workpiece.

FIG. 2 is a side view of the tool 100 of FIG. 1. As noted above, tool 100 includes a central fluid channel in communication with each of the orifices 110, and as illustrated in FIG. 2, the central fluid channel may have a machining fluid inlet 114 at the proximal end 104 of the tool. In this manner, supercritical machining fluid may be delivered into and transported through the tool 100 before exiting the orifices 110 to provide desired cooling and/or lubrication of a cutting interface.

Figure 3:
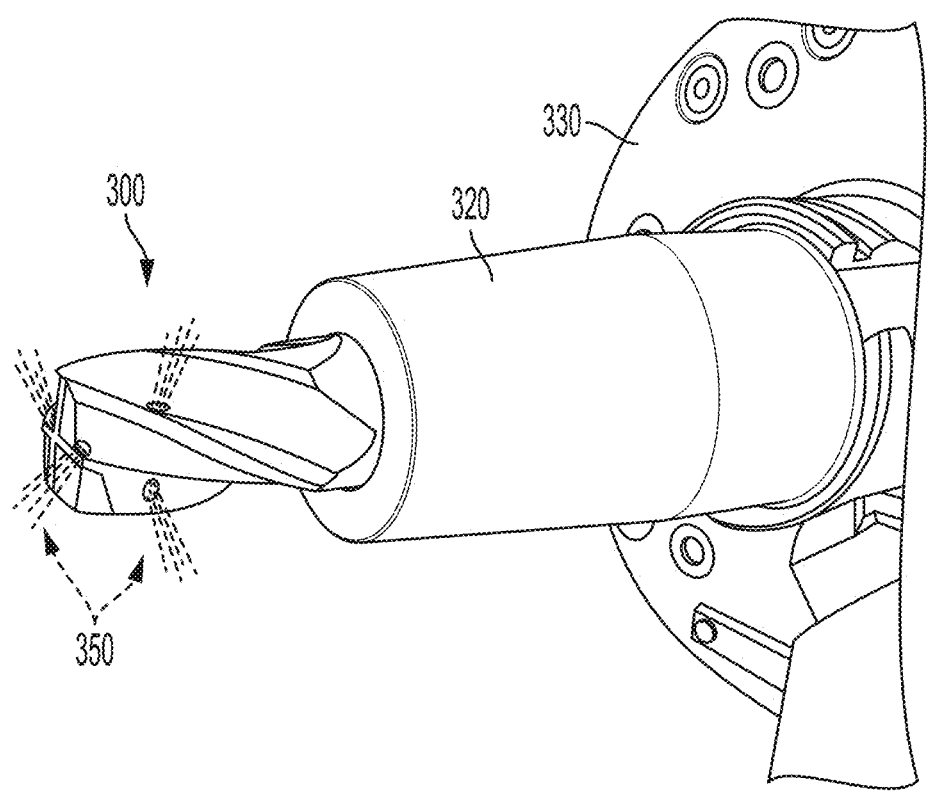
FIG. 3 is a perspective view of a tool installed in a machining system, according to some embodiments.

FIG. 3 is figure of one embodiment of a tool 300 similar to tool 100 discussed above during operation. In particular, tool 300 is secured in a tool holder 320, which is secured to a spindle 330 of a machining system. FIG. 3 further depicts supercritical machining fluid 350 (such as scCO$_2$) exiting from a plurality of orifices formed in the tool 300.

Figure 4:
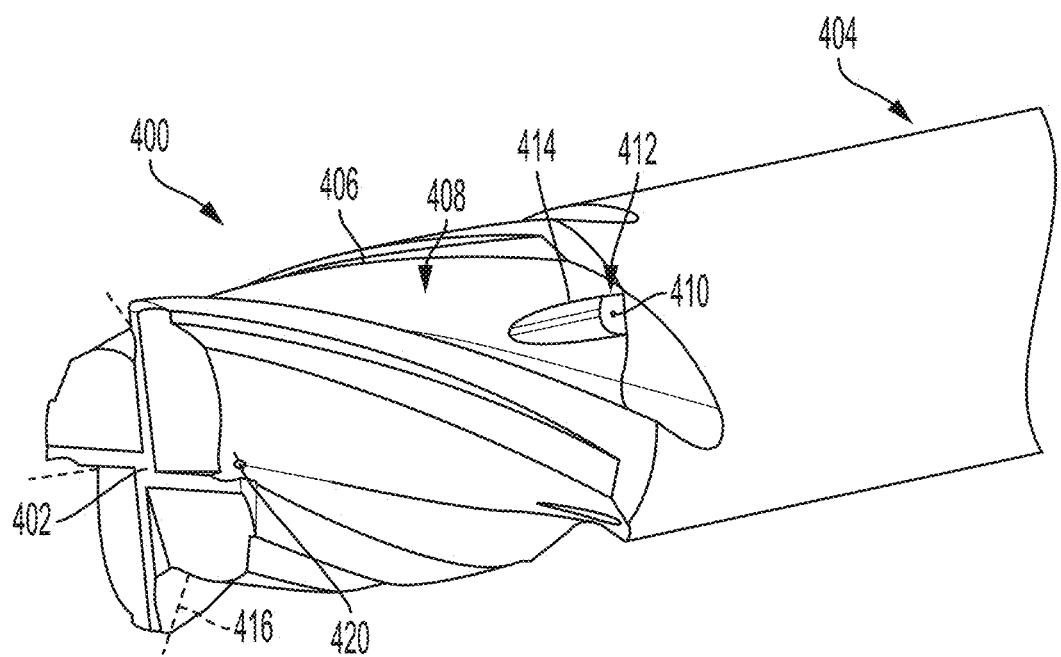
FIG. 4 is a perspective view of a tool, according to some embodiments.
Figure 5:
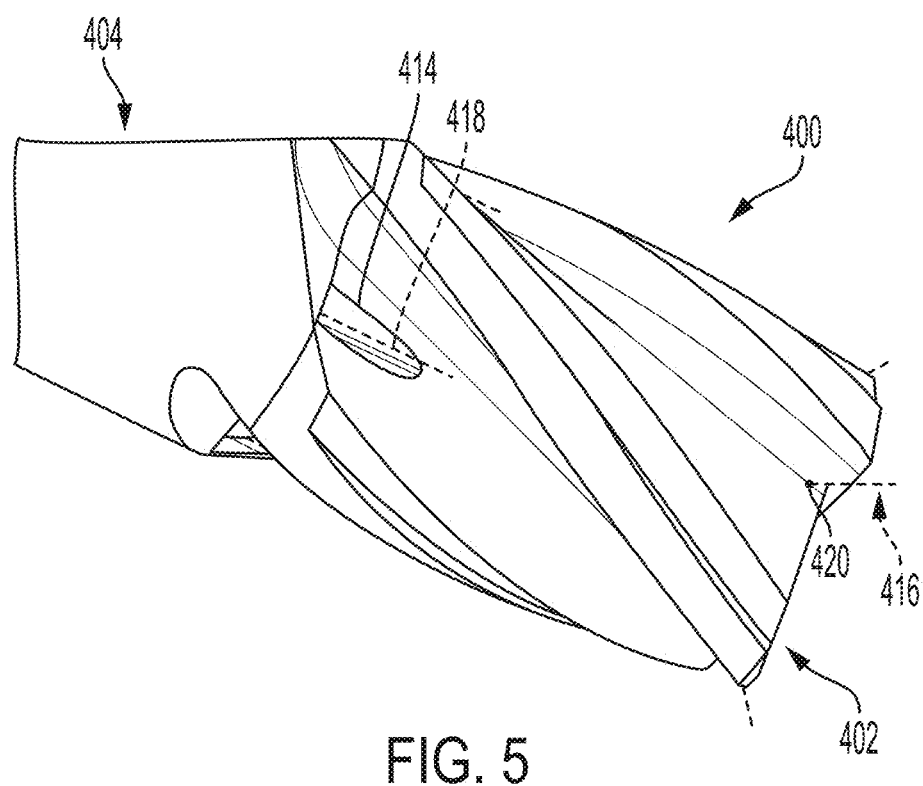
FIG. 5 is another perspective view of the tool of FIG. 4.

Referring now to FIGS. 4-5, another embodiment of a tool 400 is described in more detail. Similar to the embodiments discussed above, tool 400 includes a distal end 402 and a proximal end 404, which may be attached to a tool holder to secure the tool 400 in a machining system. The tool 400 further includes a plurality of flutes 406 separated by channels 408. In this embodiment, a plurality of orifices 410 are formed on planar surfaces 412 of recesses 414 cut into the tool. In particular, the recesses 414 are formed such that the planar surfaces 412 are normal to a longitudinal axis of the tool 400, and similar to the embodiments discussed above, each orifice 410 is in fluid communication with a central fluid channel (not depicted) formed in the tool 400. In this manner, supercritical machining fluid exiting the orifices 410 is directed along a direction parallel to the longitudinal axis, though other orientation directions are also contemplated. In some instances, the recesses 414 (and corresponding orifices and planar surfaces 412) may be positioned such that the supercritical machining fluid is directed distally and towards the flutes 406, such that the supercritical machining fluid may flow distally down the flutes 406. Moreover, as noted above, in some instances, the recesses 414 may be configured to aid in guiding supercritical fluid exiting from orifices 410 along a desired direction, such as down a length of the tool 400. In some embodiments, tool 400 may include secondary orifices 420 (e.g., formed in channels 408) such that supercritical machining fluid is directed at least partially radially outwardly from the tool (e.g., along lines 416).

Figure 6:
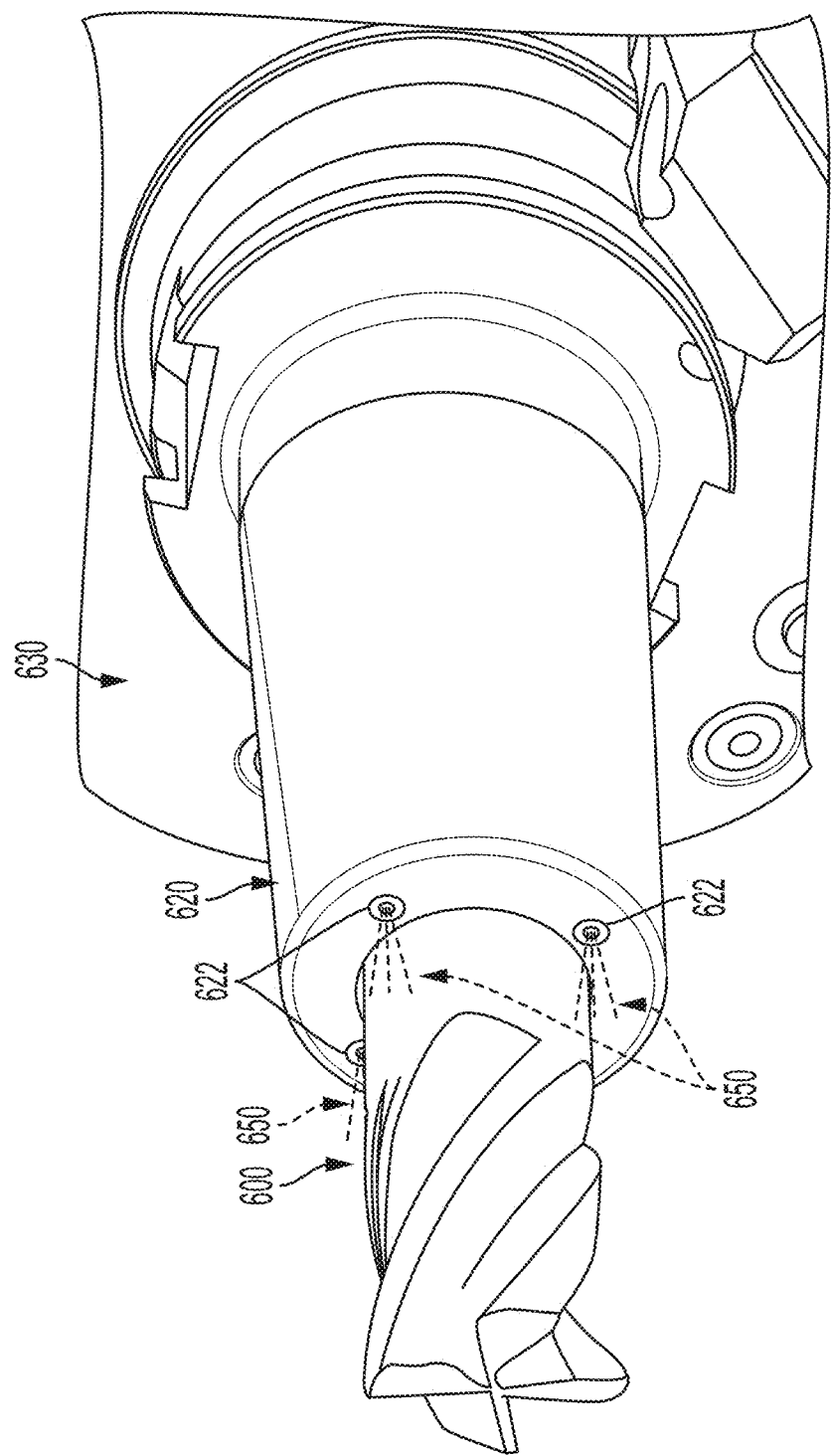
FIG. 6 is a perspective view of a portion of a machining system, according to some embodiments.

FIG. 6 depicts a portion of a machining system according to some embodiments. In particular, FIG. 6 shows a tool 600 secured in a tool holder 620, which is secured in a spindle 630. As shown in the Figure, the tool holder 620 includes a plurality of nozzles 622 configured to direct supercritical machining fluid towards a cutting interface of the tool 600. As discussed above, in some embodiments, the nozzles 622 may be configured to direct the supercritical machining fluid 650 at an angle relative to the longitudinal axis of the tool 600. For example, the nozzles may be oriented such that the supercritical machining fluid 650 contacts the tool at a position spaced from the nozzles by a distance corresponding to between about two and five times a diameter of the tool 600.

Figure 7:
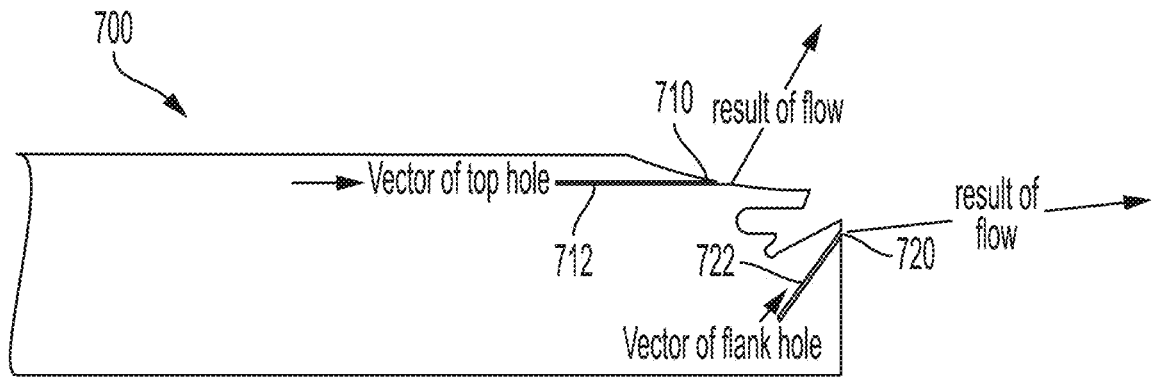
FIG. 7 is a schematic side view of one embodiment of a tool.
Figure 8:
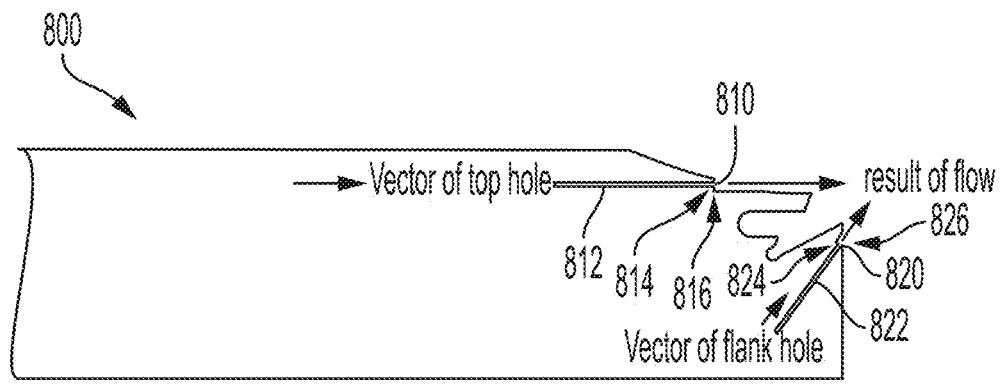
FIG. 8 is a schematic side view of another embodiment of a tool.

While some of the above-described embodiments may be related to rotatable tools (e.g., mills or similar machining tools), it should be understood that the current disclosure is not limited in this regard. For example, FIGS. 7-8 show schematic side views of cutting tools 700 and 800, respectively, which may be stationary cutting tools for use in connection with machining systems configured to rotate a workpiece (e.g., a lathe or similar system). As shown in FIG. 7, orifices 710 and 720 are simply formed in top and flank surfaces of the tool 700. As a result, supercritical fluid flowing into the top orifice along direction 712 exits along a direction that diverges from direction 712 (a direction that is generally perpendicular to the surface in which orifice 710 is formed. Similarly, supercritical fluid flowing into the flank orifice 720 along direction 722 exits along a direction that diverges from direction 722.

In contrast, the tool 800 shown in FIG. 8 includes a first surface 814 on which the top orifice 810 is formed, and a second surface 824 on which the flank orifice 820 is formed. The first surface is oriented normal to the direction 812, such that supercritical machining fluid exiting orifice 810 is parallel to direction 812. Similarly, the second surface 824 is oriented normal to direction 822 such that the supercritical machining fluid exiting orifice 820 is directed along a direction parallel to direction 822. In this manner, the surfaces 814 and 824 may allow for the supercritical machining fluid to be directed along two or more directions, as desired, to achieve desired coverage, lubrication, and/or cooling of a cutting interface. Moreover, tool 800 may include recesses 816 and 826 associated with orifices 810 and 820, respectively. The recesses may be configured to provide a clearance around each orifice such that supercritical machining fluid exiting the orifices is not inadvertently directed away from directions 812 and 822. Additionally, in some instances, the recesses 816 and 826 may aid in directing the supercritical machining fluid along directions 812 and 822.

Figure 9:
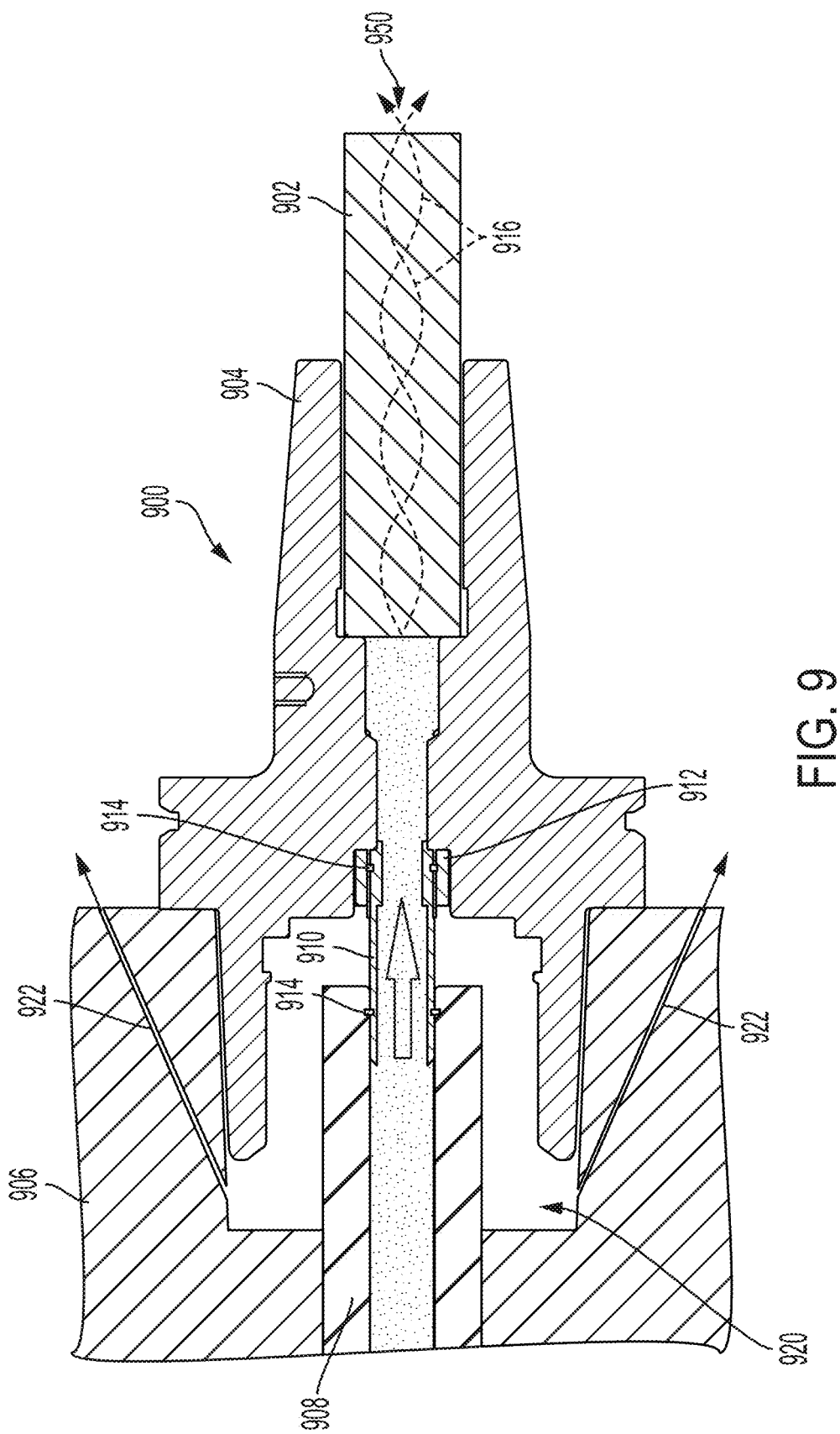
FIG. 9 is a schematic representation of a portion of a machining system, according to some embodiments.

Referring now to FIG. 9, one embodiment of a machining system 900 is described in more detail. In the depicted embodiment, the machining system includes a tool 902 held in a tool holder 904, which is secured in a spindle 906. A drawbar 908 may extend through the spindle 906 to assist with securing the tool holder 904 and tool 902 to the spindle 906. In the depicted embodiment, a coolant tube 910 extends between the drawbar 908 and the tool holder 904 to deliver supercritical machining fluid 950 traveling through the drawbar 908 into the tool holder 904, and through the tool 902 (e.g., via channels 916 formed through the tool) before the machining fluid 950 is delivered out of the tool to a cutting interface. The coolant tube 910 may be secured to the drawbar 908 and tool holder 904 via one or more bushings 912 and/or seals 914 (such as O-rings). However, as noted previously, even with such sealing arrangements associated with a coolant tube, supercritical machining fluid may leak into a cavity 920 between the spindle 906 and tool holder 904. Accumulation of pressurized supercritical machining fluid in the cavity 920 cause a build-up of pressure behind the tool holder 904, which may undesirably cause the tool holder 904 to become dislodged from the spindle 906.

In view of the above, in the depicted embodiment, the spindle 906 may include one or more venting channels 922 configured to provide a pressure relief for the cavity 920. Specifically, the venting channels are in fluid communication with the cavity 920 and an exterior of the spindle 906 and tool holder 904 such that any supercritical machining fluid 950 that may inadvertently leak into the cavity 920 may exit out of the venting channels 922. In this manner, pressure is not able to build up behind the tool holder as a result of supercritical fluid leaking into the cavity 920. While the venting channels 922 are shown as being formed in the spindle, it should be appreciated that other arrangements may be suitable. For example in other embodiments, venting channels may be formed in the tool holder 904 in addition to, or as an alternative to, the venting channels 922 formed in the spindle 906.

Figure 10:
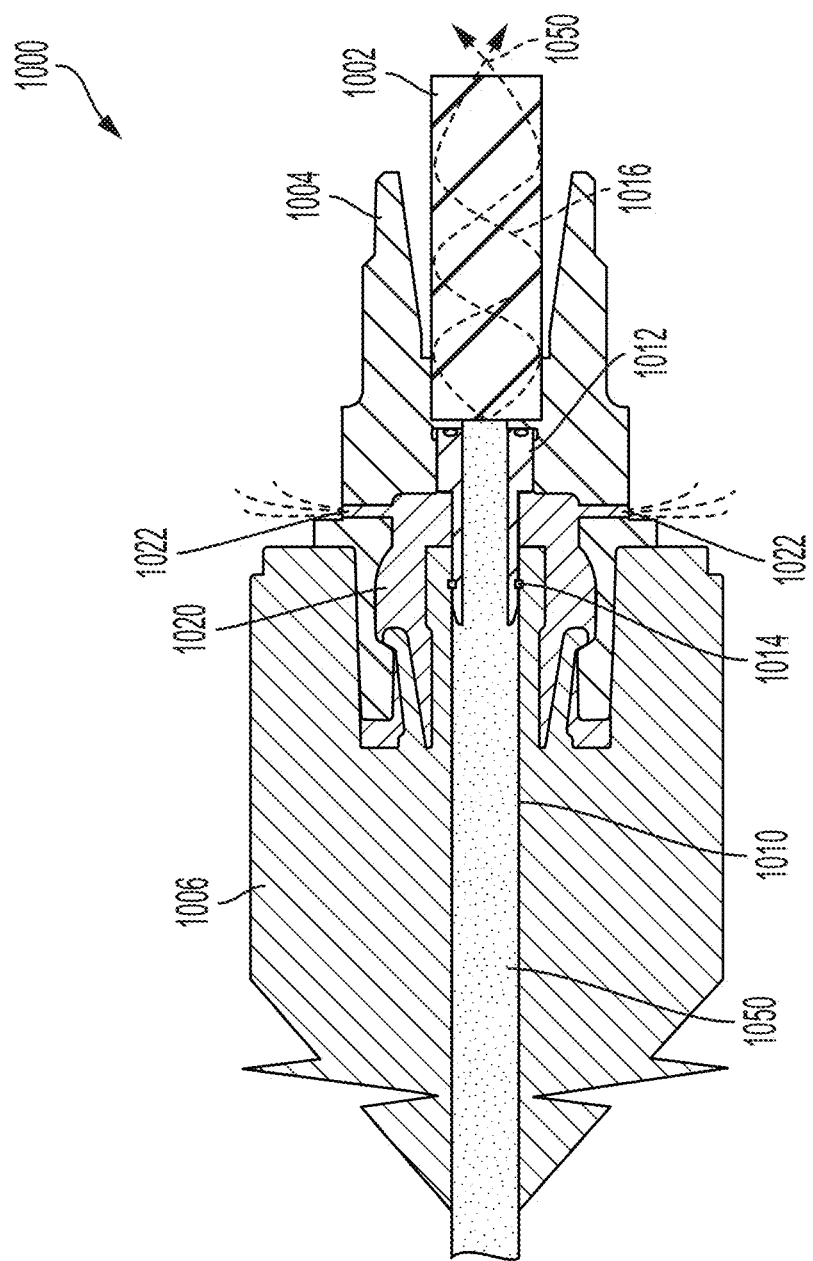
FIG. 10 is a schematic representation of a portion of a machining system, according to some embodiments.

FIG. 10 depicts a second embodiment of a machining system 1000 configured to utilize a supercritical machining fluid. In the depicted embodiment, the machine system includes a tool 1002 held in a tool holder 1004, which is secured to a spindle 1006. In FIG. 10, supercritical machining fluid 1050 flows through a coolant tube 1010 from the spindle 1006 into the tool holder 1004, and through channels 1016 formed in the tool 1002. In this embodiment, supercritical machining fluid 1050 is delivered out of the tool 1002 to a cutting interface. Bushings 1012 and/or seals 1014 (such as O-rings) may be configured to support and seal the coolant tube 1010. As noted previously, even with such sealing arrangements associated with the coolant tube 1010, supercritical machining fluid may leak into a cavity 1020 between the spindle 1006 and the tool holder 1004. Accumulation of pressurized supercritical machining fluid in the cavity 1020 may cause a build-up of pressure behind the tool holder 1004, which may undesirably cause the tool holder 1004 to become dislodged from the spindle 1006.

Accordingly, in the depicted embodiment, tool holder 1004 includes venting channels 1022 configured to provide a pressure relief for the cavity 1020. Specifically, the venting channels are in communication with the cavity 1020 and an exterior of the tool holder 1004 such that any supercritical machining fluid 1050 that may inadvertently leak into the cavity 1020 may exit out of the venting channels 1022. In this manner, pressure is not able to build up behind the tool holder as a result of supercritical fluid leaking into the cavity 1020. While the venting channels 1022 are shown as being formed in tool holder 1004, it should be appreciated that other arrangements may be suitable. For example in other embodiments, venting channels may be formed in the spindle 1006 in addition to, or as an alternative to, the venting channels 1022 formed in the tool holder 1004.

Figure 11:
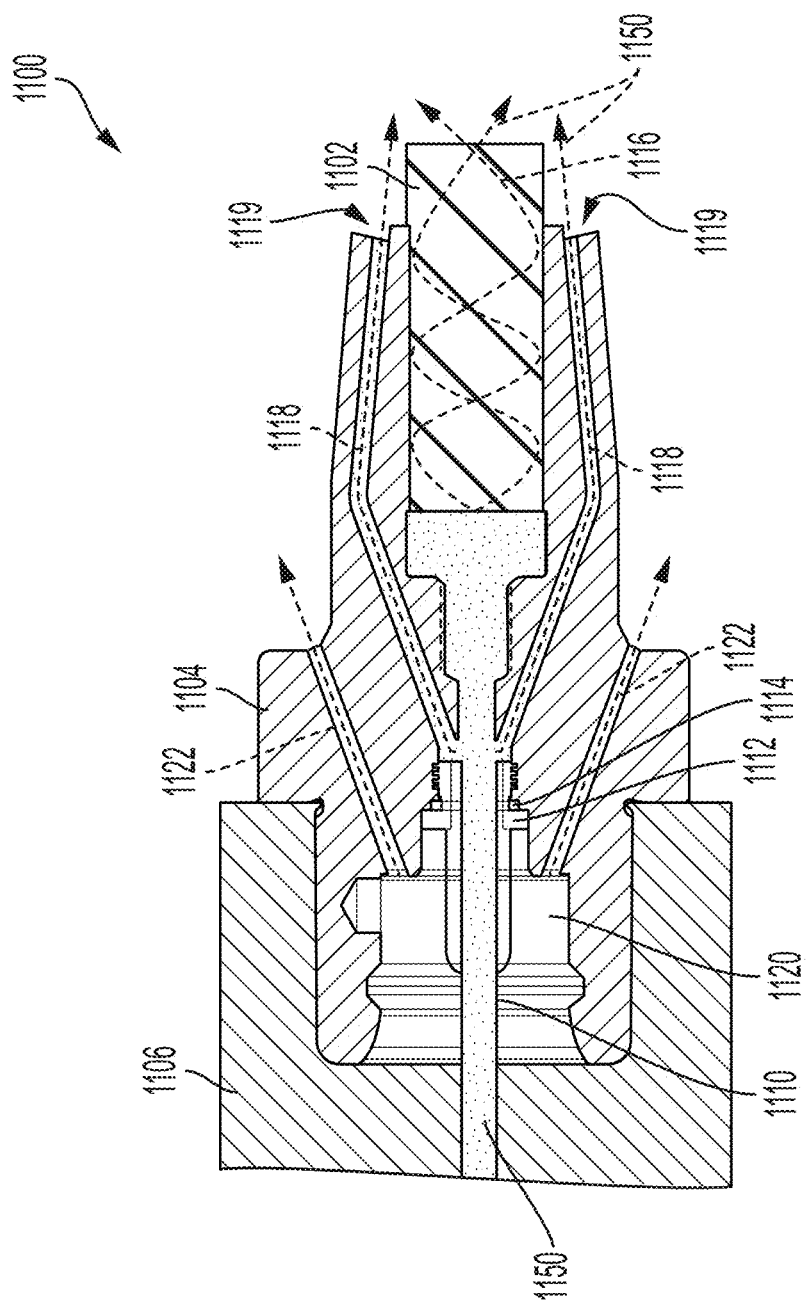
FIG. 11 is a schematic representation of a portion of a machining system, according to some embodiments.

FIG. 11 shows an alternate embodiment of a machining system 1000 configured to utilize a supercritical machining fluid similar to that described in FIG. 10. However, in the current embodiment the tool holder includes fluid paths 1118 formed in the tool holder 1104 which are also used to deliver supercritical machining fluid 1150 to the interface between the tool 1102 and a workpiece. Specifically, supercritical machining fluid 1150 flows though the coolant tube 1110 from the spindle 1106, into the tool holder 1104, and through channels 1116 formed in the tool 1102 and channels 1118 formed in the tool holder 1104. In this embodiment, supercritical machining fluid 1050 is delivered out of the tool 1102 and the tool holder 1104 to a cutting interface. Bushings 1112 and/or seals 1114 (such as O-rings) may be configured to support and seal the coolant tube 1110. As noted previously, even with such sealing arrangements associated with a coolant tube, supercritical machining fluid may leak into a cavity 1120 between the spindle 1106 and the tool holder 1104. Accumulation of pressurized supercritical machining fluid in the cavity 1120 may cause a build-up of pressure behind the tool holder 1104, which may undesirably cause the tool holder 1004 to become dislodged from the spindle 1106.

Accordingly, in the depicted embodiment, the tool holder 1104 includes venting channels 1122 configured to provide a pressure relief for the cavity 1120. Specifically, the venting channels are in communication with the cavity 1120 and an exterior of the tool holder 1104 such that any supercritical machining fluid 1150 that may inadvertently leak into the cavity 1120 may exit out of the venting channels 1122. In this manner, pressure is not able to build up behind the tool holder 1104 as a result of supercritical fluid leaking into the cavity 1120. While the venting channels 1122 are shown as being formed in tool holder 1104, it should be appreciated that other arrangements may be suitable. For example in other embodiments, venting channels may be formed in the spindle 1106 in addition to, or as an alternative to, the venting channels 1122 formed in the tool holder 1104.

In addition to the above, the tool holder 1104 includes recesses 1119 that have been formed on a surface of the tool holder oriented towards a cutting interface between the tool 1102 and a workpiece (not illustrated). As noted above, the supercritical machining fluid 1150 tends to be oriented in a direction that is normal to a surface through which it exits. Accordingly, the recesses may have a planar surface in a location where the outlets of the channels 1118 formed in the tool holder are located. Further, these planar surfaces may be oriented in a direction that is normal to a direction of flow of the supercritical machining fluid within the channel proximate to the outlets. Alternatively or additionally, these planar surfaces formed on a distal portion of the tool holder and associated with the channels may be oriented so that they are normal to a distal direction oriented towards the cutting interface. Depending on the particular embodiment, the direction may include both a component oriented in the distal direction and a radial component such that the direction is angled relative to a longitudinal axis of the tool holder and tool. This radial component may either be oriented in a radial direction outwards from the tool and tool holder and/or inwards towards a central axis passing through the tool and tool holder as depicted in the figure. In either case, the use of one or more planar surfaces associated with one or more channels formed in the tool holder may provide a desired flow of supercritical machining fluid from the tool holder to a desired cutting interface during operation.

In the above embodiment, the use of planar surfaces which may be formed in corresponding recesses, or in another appropriate surface feature of a tool holder, are used to direct a flow of supercritical machining fluid in a desired direction. However, embodiments in which one or more nozzles positioned on a distal portion of a tool holder and in fluid communication with the one or more channels 1118 in the tool holder transporting the flows of supercritical machining fluid 1150 are also contemplated. For example, the nozzles which may have a tapering cross-sectional profile that narrows towards a distal tip of the nozzle may be used to direct a flow of supercritical machining fluid towards a desired cutting interface in the directions noted above. The nozzles may be attached to a distal portion of a tool holder using any appropriate connection including, threaded connections, welding, mechanical interlocking features, and/or any other appropriate connection. Further, the nozzles may either be permanently attached to the tool holder and/or may be removable as the disclosure is not limited in this fashion.

Figure 12:
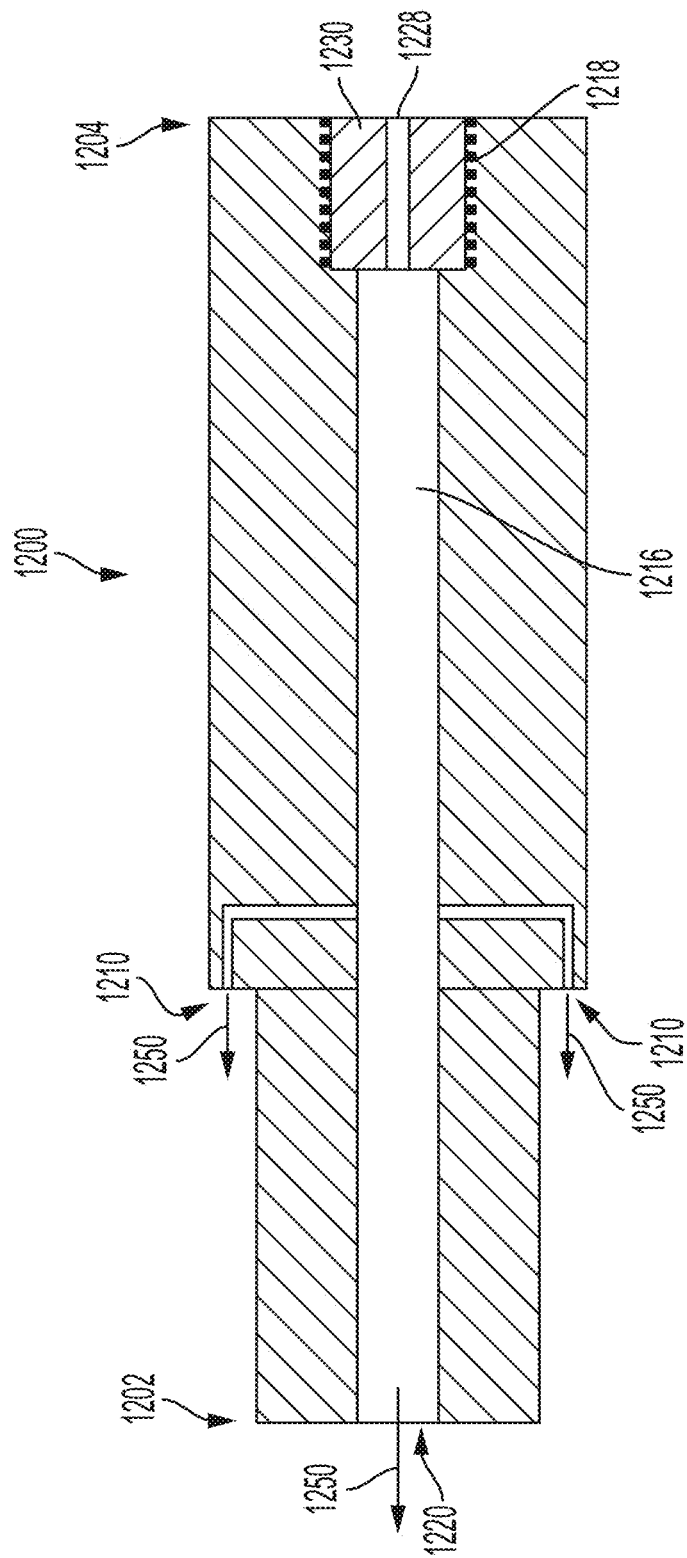
FIG. 12 is a schematic side view of a tool, according to some embodiments.

FIG. 12 is a side view of one embodiment of a tool 1200 in accordance with some embodiments. In particular, the tool 1200, which may be configured as a milling tool and/or for use with a machining center, though other machining tools are also contemplated. The tool includes a distal end 1202 and a proximal end 1204 (e.g., a shank of the tool 1200), which may be received in a tool holder of a machining system (not depicted). In the embodiment of FIG. 12, a supercritical machining fluid 1250 flows through an inlet of the tool which in the depicted embodiment is an inlet of a flow a restriction 1230. The flow restriction may be located in a proximal portion, or end, of the tool. However, embodiments in which the flow restriction is distanced from a proximal end of the tool are also contemplated.

After flowing into the flow restriction 1230, the supercritical machining fluid may flow into a fluid channel 1216 that is downstream from and in fluid communication with the flow restriction. The channel may have an increased diameter and a correspondingly decreased flow resistance as compared to the flow restriction. Accordingly, the supercritical machining fluid may expand within the fluid channel. Once the supercritical machining fluid 1250 has expanded in the fluid channel 1216, it may flow out through one or more orifices that are formed in the tool and in fluid communication with the fluid channel. For example, in one embodiment, a plurality of first orifices 1210 located on a portion of the tool distanced from a distal end of the tool and/or one or more second orifices 1220 formed on a distal end of the tool may be used to direct the flow of expanded supercritical machining fluid onto a desired cutting interface. As shown, each of the orifices 1210 and 1220 are configured such that the expanded supercritical machining fluid 1250 is delivered to the cutting interface in a direction substantially parallel to a longitudinal axis of the tool 1200. However, embodiments in which the supercritical machining fluid is directed in a direction that is angled relative to the longitudinal axis of the tool are also contemplated.

In the embodiment depicted in FIG. 12, the flow restriction 1230 is provided as an insert that is disposed in a correspondingly sized and shaped cavity formed in a proximal portion of the tool 1200. For example, the fluid restriction may be a valve, or other construction, that is threaded into a threaded recess formed in a proximal portion of the tool 1200 via threads 1218 though any other appropriate type of connection may be used as previously noted. The flow restriction is upstream from and in fluid communication with one or more fluid channels 1226 that extend at least partially, and in some instances entirely, along a length of the tool. The one or more fluid channels are in fluid communication with one or more corresponding orifices 1210 and 1220 either distanced from or located at a distal end of the tool. As noted above, the flow resistance of flow restriction 1230 may be greater than the flow resistances of the fluid channel and one or more orifices of the tool.

In the above embodiment, the flow restriction 1230 is threaded into the tool 1200. However, it should be appreciated that any suitable coupling can be used. For example, in other embodiments, a flow restriction may be connected to the tool using a press fit, welding, brazing, and/or any other appropriate type of connection as the disclosure is not limited in this fashion. Additionally, embodiments in which a flow restriction is integrally formed with a tool are also contemplated.

In the embodiment depicted in FIG. 12, the flow restriction 1230 has a straight narrow orifice 1228 extending through the flow restriction. However, it should be understood that a flow restriction may have any appropriate construction capable of operating in the described fashion including, for example, nozzles in fluid communication with a fluid channel of the tool and/or any other appropriate construction. Further, different types of flow restrictions may be desirable depending on the type of tool, workpiece, or supercritical machining fluid composition being used.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Thus, while the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

Also, some embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions may be described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A tool for a machining system utilizing a supercritical machining fluid, the tool comprising:
   a tool body extending from a proximal portion of the tool configured to be received in a tool holder to a distal end of the tool;
   a fluid channel formed in the tool body and having an inlet located in a proximal portion of the tool body, wherein the inlet is configured to receive the supercritical machining fluid;
   a plurality of orifices formed on an outer surface of the tool body, wherein each orifice of the plurality of orifices is in fluid communication with the fluid channel, and wherein at least one orifice of the plurality of orifices is located on a side surface of the tool body, and wherein each orifice has a diameter between about 50 microns and about 500 microns; and
   a flow restriction disposed in the tool body, wherein the flow restriction is upstream from and in fluid communication with the fluid channel, and wherein the flow restriction is configured to expand the supercritical machining fluid as it flows through the flow restriction.

2. The tool of claim 1, further comprising a plurality of flutes formed in a distal portion of the tool body separated by a plurality of grooves, wherein at least a portion of the plurality of orifices are formed within the grooves.

3. The tool of claim 1, wherein the fluid channel is configured to receive the supercritical machining fluid.

4. The tool of claim 3, wherein the supercritical machining fluid comprises supercritical carbon dioxide.

5. The tool of claim 1, wherein the plurality orifices are formed in a corresponding plurality of planar surfaces formed on an outer surface of the tool.

6. The tool of claim 5, wherein at least a portion of the planar surfaces are normal to a longitudinal axis of the tool and/or a direction oriented towards a cutting interface of the tool.

7. The tool of claim 1, further comprising at least one recess formed on an outer surface of the tool body, wherein the at least one recess defines at least one surface oriented along a first direction and the at least one recess is spaced from the distal end of the tool body.

8. The tool of claim 7, wherein at least one orifice of the one or more orifices is formed in the at least one surface.

9. The tool of claim 1, further comprising an insert including the flow restriction disposed in a cavity formed in the proximal portion of the tool body, and wherein a flow resistance of the flow restriction is greater than a flow resistance of the plurality of orifices and the fluid channel.

10. A tool for a machining system utilizing a supercritical machining fluid, the tool comprising:
    a tool body extending from a proximal portion configured to be received in a tool holder to a distal end;
    a fluid channel formed in the tool body and having an inlet at the proximal end of the tool body;
    a flow restriction disposed in the tool body, wherein the flow restriction is upstream from and in fluid communication with the fluid channel, and wherein the flow restriction is configured to expand the supercritical machining fluid as it flows through the flow restriction;

at least one recess formed on an outer surface of the tool body, wherein the at least one recess defines at least one surface normal to a first direction and the at least one recess is spaced from the distal end of the tool body; and an orifice formed in the at least one surface and in fluid communication with the fluid channel, wherein the orifice is configured to direct supercritical machining fluid out of the orifice along the first direction.

11. The tool of claim 10, wherein the first direction is substantially parallel to a longitudinal axis of the tool body.

12. The tool of claim 11, wherein the at least one surface is normal to the longitudinal axis of the tool body.

13. The tool of claim 10, further comprising at least one flute formed in a distal portion of the tool body, wherein the supercritical machining fluid from the orifice is directed at least partially towards the at least one flute.

14. The tool of claim 10, wherein the supercritical machining fluid comprises supercritical carbon dioxide.

15. The tool of claim 10, wherein the orifice has a diameter of between about 50 microns and about 500 microns.

16. Tool of claim 10, wherein the at least one surface is planar.

17. A tool for a machining system utilizing a supercritical machining fluid, the tool comprising:
    a tool body extending from a proximal end configured to be received in a tool holder to a distal end;
    an inlet formed in a proximal portion of the tool body, wherein the inlet is configured to receive a supercritical machining fluid;
    a flow restriction disposed in the tool body and in fluid communication with the inlet wherein the flow restriction is configured to expand the supercritical machining fluid as it flows through the flow restriction;
    a fluid channel formed in the tool body, wherein the fluid channel is downstream from and in fluid communication with the flow restriction; and
    one or more orifices formed on an outer surface of the tool body, wherein each orifice of the one or more orifices is in fluid communication with the fluid channel, and wherein a flow resistance of the one or more orifices and the fluid channel is less than a flow resistance of the flow restriction.

18. The tool of claim 17, wherein flow restriction is a nozzle.

19. The tool of claim 17, wherein the flow restriction is an insert disposed in a cavity formed in a proximal portion of the tool body.

20. The tool of claim 17, further comprising a plurality of flutes formed in a distal portion of the tool body separated by a plurality of grooves, wherein at least a portion of the plurality of orifices are formed within the plurality of grooves.

21. The tool of claim 17, wherein the supercritical machining fluid comprises supercritical carbon dioxide.

22. The tool of claim 17, wherein each orifice of the one or more orifices has a diameter between about 50 microns and about 500 microns.

23. The tool of claim 17, wherein a ratio of the flow resistance of the flow restriction and a combined flow resistance of the fluid channel and the one or more orifices is greater than or equal to 4.

24. A tool for a machining system utilizing a supercritical machining fluid, the tool comprising:
    a tool body comprising a fluid channel, the tool body extending from a proximal end configured to be received in a tool holder to a distal end, the tool body further comprising one or more orifices located on an outer surface of the tool body, wherein each of the one or more orifices is in fluid communication with the fluid channel of the tool body;
    an insert including a flow restriction disposed in a cavity formed in a proximal portion of the tool body, wherein the flow restriction is upstream from and in fluid communication with the fluid channel of the tool body, wherein a flow resistance of the flow restriction is greater than a flow resistance of the one or more orifices and the fluid channel, and wherein the flow restriction is configured to expand the supercritical machining fluid as it flows through the flow restriction.

25. The tool of claim 24, wherein the insert is threaded into the cavity.

26. The tool of claim 24, further comprising a plurality of flutes formed in a distal portion of the tool body separated by a plurality of grooves, wherein at least a portion of the one or more orifices are formed within the plurality of grooves.

27. The tool of claim 24, wherein the supercritical machining fluid comprises supercritical carbon dioxide.

28. The tool of claim 24, wherein each orifice of the one or more orifices has a diameter between about 50 microns and about 500 microns.

29. The tool of claim 24, wherein a ratio of a flow resistance of the flow restriction and a combined flow resistance of the fluid channel and one or more orifices is greater than or equal to 4.

* * * * *